May 30, 1967 C. J. MILAZZO 3,322,259
ACCUMULATING TRANSFER CONVEYOR
Filed Feb. 1, 1966 4 Sheets-Sheet 1
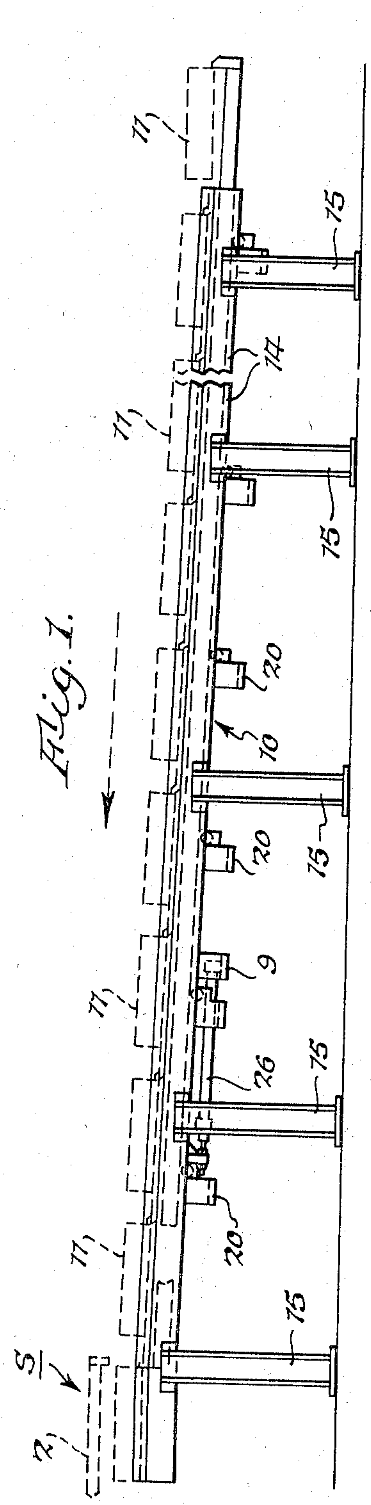
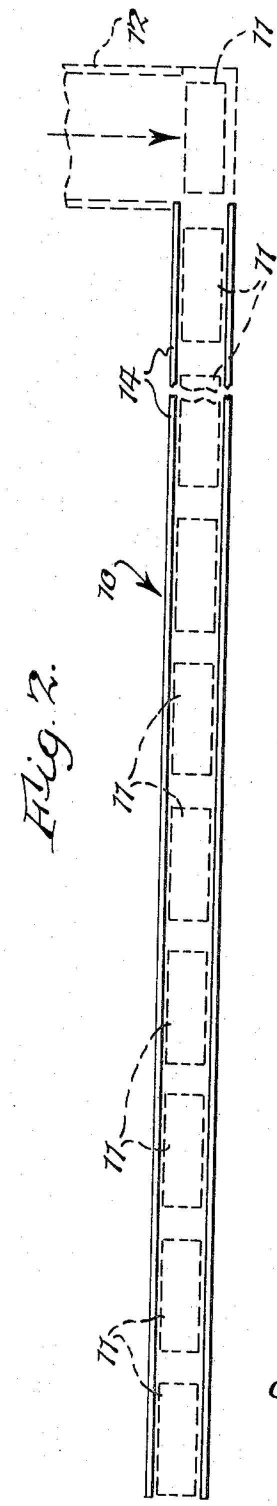
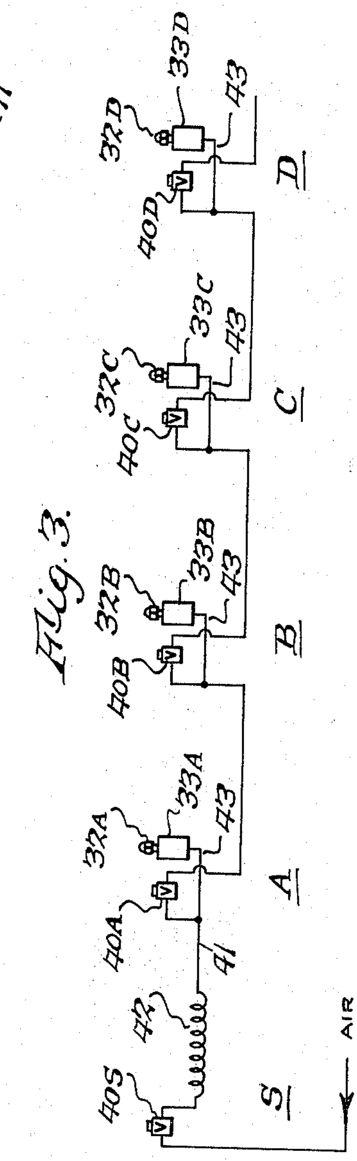
INVENTOR.
Carl J. Milazzo
BY
Christel & Bean
ATTORNEYS.

ACCUMULATING TRANSFER CONVEYOR
Filed Feb. 1, 1966
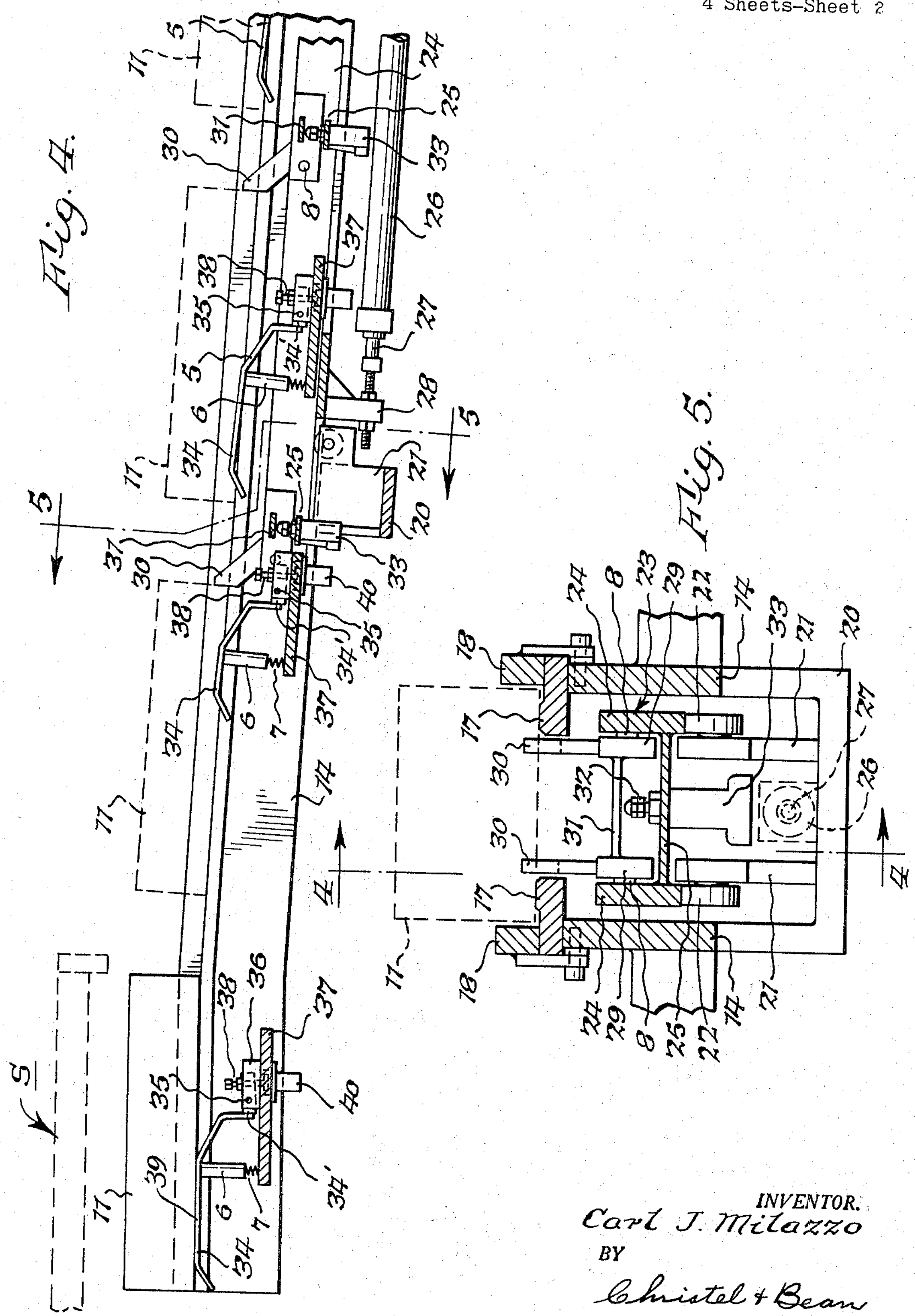
INVENTOR.
Carl J. Milazzo
BY
Christel + Bean
ATTORNEYS.

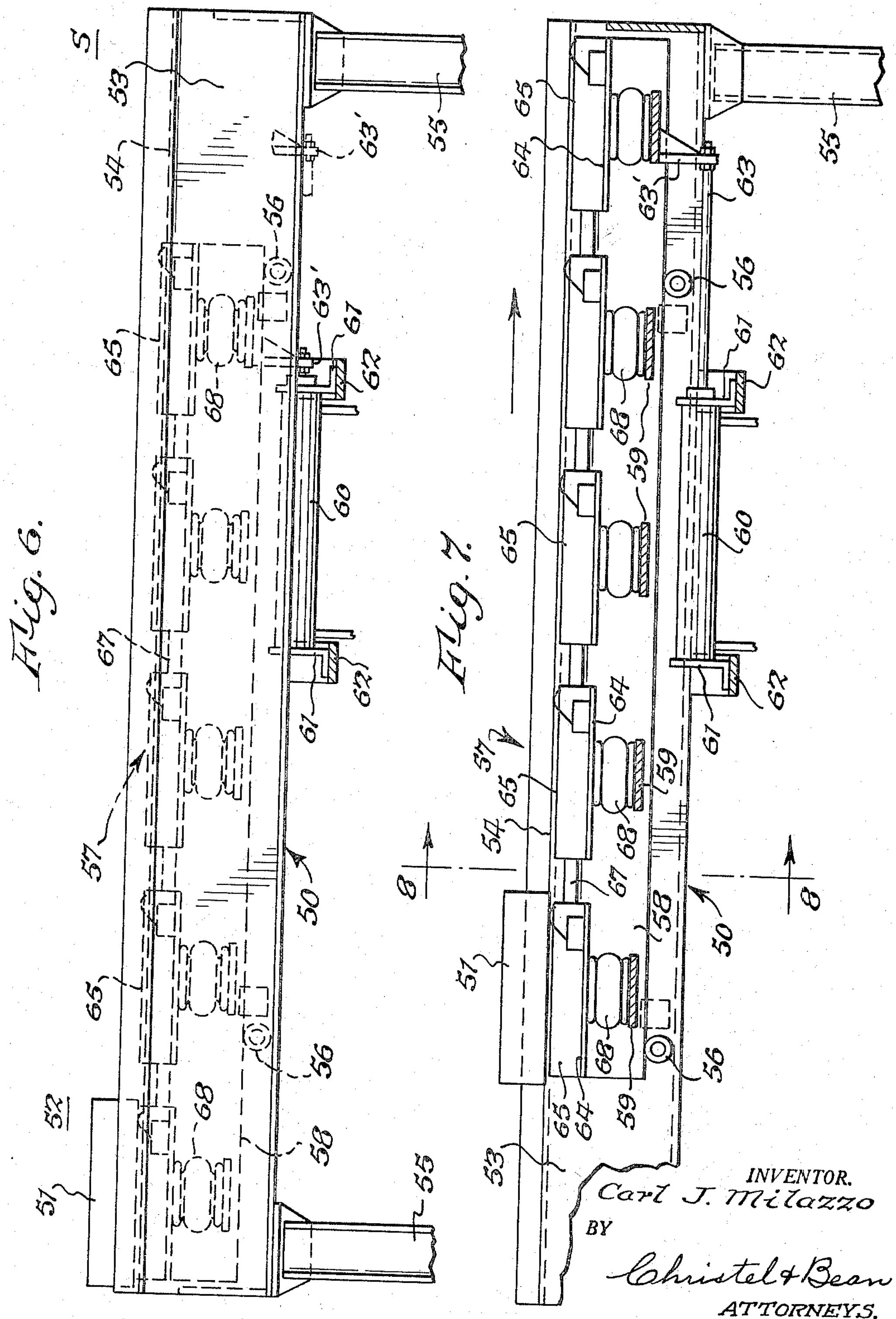
INVENTOR.
Carl J. Milazzo
BY
Christel & Bean
ATTORNEYS.

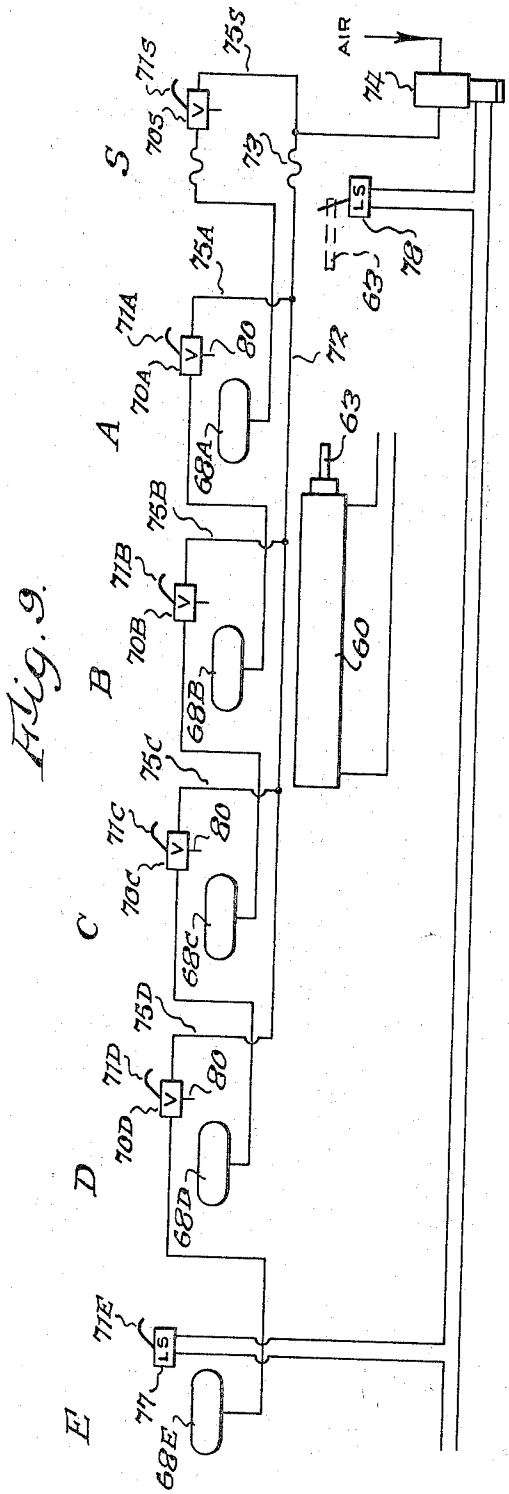
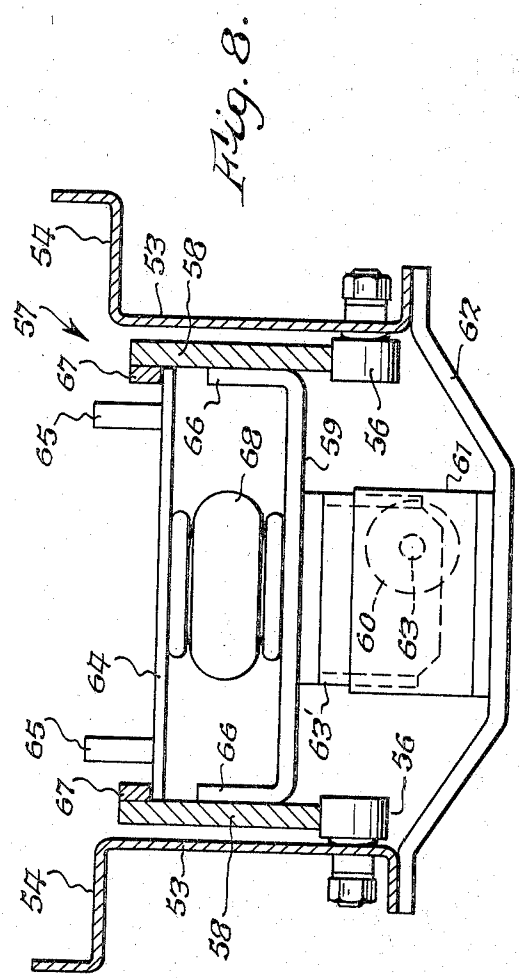
INVENTOR.
Carl J. Milazzo
BY
Christel & Bean
ATTORNEYS.

United States Patent Office 3,322,259

Patented May 30, 1967

3,322,259

ACCUMULATING TRANSFER CONVEYOR

Carl J. Milazzo, Tonawanda, N.Y., assignor to Hohl Machine & Conveyor Co., Inc., Buffalo, N.Y.

Filed Feb. 1, 1966, Ser. No. 524,320
10 Claims. (Cl. 198—219)

This invention relates generally to the conveyor art and in particular to a transfer conveyor of the accumulating type.

Customarily, articles are transferred by conveyors of the non-accumulating type. Such conveyors require continuous removal of articles from the discharge end to avoid jamming and article spill-over. When removal is not continuous, or only sporadic the conveyor frequently must be shut down. This interrupts not only the conveyor operation but also the preceding operation, leading to the conveyor, notwithstanding that there may be space available for additional articles on the conveyor during such shut down.

Accumulating transfer conveyors have been developed. However, so far as I am aware such conveyors have been either relatively complex or adapted only for handling special types of articles.

Accordingly, a primary object of the present invention is to provide a relatively simple and inexpensive accumulating transfer conveyor of general utility which will continue to receive and advance articles along the conveyor until all available positions thereon are filled, even though the article at the conveyor discharge is not removed.

It is another object of the present invention to provide an accumulating transfer conveyor as aforesaid which will accumulate articles thereon and need not be shut down even when all article receiving positions on the conveyor are filled.

In addition, a particularly important object of this invention is to provide an accumulating transfer conveyor having the foregoing characteristics and wherein the articles are lifted and carried between successive positions.

In one aspect thereof, an accumulating transfer conveyor of this invention is characterized by the provision of a conveyor frame adapted to support articles at a plurality of positions along the conveyor, transfer means associated with each position for advancing articles from a first position to successive positions, article sensing means and article transfer disabling means associated with each position, and means at each position operable in response to the presence of an article blocking one position to disable the preceding transfer means, whereby the preceding article remains stationary.

The foregoing and other objects, advantages and characterizing features of accumulating transfer conveyors of the present invention will become apparent from the following detailed description of two embodiments thereof. It is to be understood that such embodiments are by way of example only and to illustrate the principles of the present invention, the scope of which is limited only as defined in the appended claims. In the drawings:

FIG. 1 is a view in side elevation of a conveyor of the present invention showing the input and discharge ends thereof, with articles carried thereof shown in phantom; the conveyor being broken away for ease of illustration and to indicate a greater length;

FIG. 2 is a fragmentary top plan view of the conveyor of FIG. 1;

FIG. 3 is a schematic illustration of a fluid control circuit for use with the conveyor of FIGS. 1 and 2;

FIG. 4 is a fragmentary, longitudinal sectional view on an enlarged scale, taken about on line 4—4 of FIG. 5 and showing the discharge end portion of the conveyor of FIG. 1;

FIG. 5 is a fragmentary, transverse sectional view thereof taken about on line 5—5 of FIG. 4;

FIG. 6 is a view in side elevation of another embodiment of a conveyor of my invention, with articles and their advancing means spaced therealong in a retracted position; parts being broken away for ease of illustration;

FIG. 7 is a longitudinal sectional view thereof, similar to that of FIG. 6, with the advancing means in advanced position and with parts broken away for ease of illustration;

FIG. 8 is an enlarged, transverse sectional view thereof taken about on line 8—8 of FIG. 7; and FIG. 9 is a schematic illustration of a fluid control circuit for use with the conveyor shown in FIGS. 6–8.

Referring now in detail to the illustrative embodiment depicted in FIGS. 1 through 5 of the accompanying drawing, there is shown an accumulating transfer conveyor, generally designated 10, adapted to receive articles 11 from an input 12 of any desired type and to advance same along the conveyor intermittently between adjacent article rest positions to a discharge staiton S. Conveyor 10 comprises a base frame including two transversely spaced side members 14 extending the length of conveyor 10 and supported by a plurality of longitudinally spaced upright support members 15. A pair of longitudinally extending track members 17 are secured on the top of each side member 14 in transversely spaced relation for supporting articles 11 as they slide toward discharge S. An upstanding guide rail 18 is secured on top of each track member 17, outwardly of the track way, for guiding each article as it slides therealong.

A plurality of longitudinally spaced U-shaped support brackets 20 depend from base frame members 14, each bracket carrying a pair of upstanding, transversely spaced roller support members 21. A roller 22 is journalled on each support member 21 and projects laterally outwardly thereof for supporting an article advancing means adapted to intermittently advance articles along the conveyor to succeeding article rest positions.

The article advancing means includes a carriage, generally designated 23, comprising a pair of transversely spaced, longitudinally extending side members 24 supported by rollers 22, thereby adapting carriage 23 for reciprocating movement lengthwise of conveyor 10 as will appear presently. Cross members 25 rigidly secure members 24 to one another at longitudinal spaced positions corresponding to each article rest position as hereinafter decribed.

A carriage reciprocating drive is provided, and can comprise a two-way pneumatic piston and cylinder arrangement of conventional design which reciprocates carriage 23 on rollers 22, intermittently advancing each article along conveyor 10 from one rest position to succeeding article rest positions. In the illustrated form, the carriage drive comprises a cylinder 26 secured at one end to a bracket 9 on base frame 14. A piston rod 27 extends from the opposite end of cylinder 26 and has an adjustable connection with a drive bracket 28 as shown in FIG. 4. Bracket 28 depends from carriage 23, and is positioned so that drive bracket 28 and piston rod 27 pass between support members 21 when carriage 23 is reciprocated.

The article advancing means further includes at each article rest position, a pusher assembly comprising a pair of members 29 joined by a cross bar 31 and pivotally mounted at 8 on members 24 for movement with carriage 23, each member 29 having a pusher dog 30 projecting upwardly therefrom above tracks 17 to engage behind an article for advancing the same to the next succeeding article rest position. The pivot mounting 8 of each pusher assembly is offset from the center of gravity thereof in a direction biasing each pusher assembly to its extended position shown in FIG. 4. In this position, dogs 30 extend above tracks 17 for engaging behind articles 11. As carriage 23 is advanced, by extension of piston 27, it carries with it dogs 30 which engage behind articles on the conveyor and slide them along tracks 17 to the succeeding article rest positions. When carriage 23 is retracted, the dogs freely pivot counterclockwise, as viewed in FIG. 4, as they bear against and slide along the underside of any interfering articles.

Disabling means are provided at each article rest position, with the exception of discharge S, to interrupt the advancement of articles. In the illustrated form, such means comprise a pneumatic cylinder 33 secured to cross member 25 in an upright position directly beneath bar 31, and a piston rod having a head 32 in abutting relation with bar 31. Such disabling means operates by extending piston head 32 upwardly, thereby pivoting the pusher assembly sufficiently to retract dogs 30 associated article when carriage 23 is advanced. Any suitable piston-cylinder arrangement can be used, such as a single acting, spring return air cylinder.

An article sensor is provided at each article rest position for sensing the presence or absence of an article at that position. In the illustrated form, the article sensor comprises an arm 34 spring loaded to project upwardly between tracks 17 into the path of advancing articles and abut the undersides thereof, the arms 34 being depressed against their spring bias by the articles 11. Arm 34 is carried by a base portion 34' pivotally mounted at 35 on a frame 36 secured to a cross bar support 37 extending between members 24 of carriage 23. A valve actuator plunger 38 is mounted on base portion 34' for purposes as will appear. The article abutting surface 39 of arm 34 extends longitudinally a distance sufficient to span the gap between the articles at adjacent article rest positions, thereby precluding false sensing signals during the transfer of articles between adjacent positions. Arms 34 have inclined cam surfaces on opposite sides of surfaces 39, as shown at 4 and 5. Arms 34 are depressed when an article on track 17 abuts surface 39 and otherwise are raised by the bias of springs 7 thereof which are carried by cross bars 37 and confined by sleeve 6 depending from arms 34. Plungers 38 are reciprocated by such pivotal movement of arms 34, the plungers forming a portion of a fluid control system which will now be described.

The control system is preferably of the pneumatic type, and comprises an air valve 40 including actuator plunger 38 secured to support 37 at each article rest position for reciprocation with carriage 23. Valves 40 can be of known construction, such as the three-way spring return air valve Model 250 P–3–10–21–40 made by Humphrey Products Division, General Gas Light Company, Box 2008, Kalamazoo, Mich.

The control system is schematically illustrated in FIG. 3, where four exemplary article rest positions are indicated at A, B, C, and D, and the discharge article rest position is indicated at S, it being understood that any number of positions and associated transfer apparatus can be utilized depending on the length of conveyor 10, the stroke of carriage 23, and other factors. Each position A through D includes, in addition to an article sensor arm 34 and an article advancing pusher assembly, a valve 40 and a disabling cylinder 33 and piston head 32, each being labelled in FIG. 3 in accordance with its respective position. Discharge position S requires only a fixed valve 40S associated with an article sensing arm. Valves 40 are connected in series through an air supply line 41 communicating with a source of air under positive pressure, the air line between discharge station S and position A being flexible as indicated at 42 to accommodate reciprocation of the carriage mounted valves 40 and cylinders 33 relative to the fixed valve 40 at discharge station S. Valves 40 are normally closed, being opened by depression of sensor arm 34 when there is an article at the associated position.

When an article is sensed by arm 34 at the respective article rest position, the associated valve 40 is opened and allows air to pass therethrough into the disabling cylinder 33 associated with the immediately preceding station, via line 43. However, since valves 40 are connected in series, the valves at succeeding positions in the direction of article advance must all be opened in order for the preceding valves and disabling cylinders to become operable.

The operation of the accumulating conveyor of FIGS. 1 through 5 will become clear from the following. The carriage drive including cylinder 26 and piston rod 27 is actuated by known means to advance carriage 23 along rollers 22 with pusher dogs 30 engaging behind each article and sliding the same along tracks 17 from its initial article rest position to the next succeeding article rest position. The carriage drive then retracts carriage 23 with pusher dogs 30 being cammed out of the way by articles at the next preceding positions. The reciprocating motion of carriage 23 and pusher dogs 30 is repeated and each article thereby is intermittently advanced step-by-step from one article position to successive article positions along conveyor 10 and ultimately to discharge station S.

If there is no article at discharge station S, valve 40S remains closed and all of the preceding valves 40 and disabling cylinders 33 are rendered inoperative. However, when sensing arm 34 at station S is depressed by an unremoved article blocking station S, valve 40S is opened, admitting air through lines 42 and 43 into disabling cylinder 33A at the next preceding article rest position A. The article transfer disabling means at position A is actuated by the introduction of air into cylinder 33A, the disabling head 32A pivoting dogs 30 at position A into retracted position between tracks 17. An article at position A therefore remains stationary as the carriage is advanced. If there is no article at position A its sensing arm 34 remains raised, causing valve 40A to remain closed and thereby preventing transmission of air to preceding positions B, C and D. The article advancing means at positions B, C and D will then continue to advance articles along the conveyor step-by-step until an article is advanced into position A. Once this occurs, and assuming that an article still blocks the discharge S, sensing arm 34 at position A is depressed, opening valve 40A and admitting air into the next preceding valve 40B, disabling the article advancing means at position B. If there is no article at position B, valve 30B remains closed and the article advancing means at positions C and D continue to intermittently slide articles toward position B. Once an article moves into position B, and assuming that positions S and A remain blocked, valve 40B is opened and admits air into cylinder 31C thereby disabling the transfer means at the next preceding position C. The cycle action is repeated as each succeeding position becomes blocked.

Thus, articles can be accumulated on conveyor 10 while the conveyor continues running. Articles are advanced until all positions are filled, but only when there is a succeeding article rest position vacant and capable of receiving an article. If at any point in the above operation the article at station S is removed, unblocking the discharge, valve 40S closes and precludes the admission of air to all preceding disabling cylinders at positions A, B, C, and D, restoring normal transfer operation of the article advancing means until such time as an article again blocks station S. Obviously, any suitable article removal means 2 can be provided at discharge station S.

In the embodiment depicted in FIGS. 6 through 9, there is shown a conveyor generally designated at 50 adapted to receive articles 51 from any suitable input end 52 and to advance the same along the conveyor intermittently between adjacent article rest positions to a discharge station S. While similar in this respect and in its accumulating ability to the embodiment of FIGS. 1 through 5, conveyor 50 differs significantly therefrom in that it lifts and carries the articles from station to station, rather than sliding them along the conveyor. Conveyor 50 comprises a base frame including transversely spaced longitudinally extending side members 53 providing laterally projecting article support rails 54 on the upper portions thereof, the members 53 being secured to and supported by longitudinally spaced upright supports 55. Longitudinally spaced rollers 56 are rotatably secured along the lower inside portions of each side member 53.

An article advancing means is provided and comprises a carriage, generally designated 57, including longitudinally extending, transversely spaced side members 58 joined at spaced points therealong by generally U-shaped cross member 59 and supported on rollers 56. A carriage reciprocating drive is provided and can comprise a two-way pneumatic cylinder and piston drive arrangement, as before, including a cylinder 60 secured between upstanding members 61 mounted on longitudinally spaced brackets 62 depending from and extending between lower portions of side members 53. A piston rod 63 extends from cylinder 60 and is secured to a drive plate 63″ depending from cross member 59. The drive reciprocates carriage 57 on rollers 56 between adjacent article rest positions.

The article advancing means further includes at each position a lifting plate 64 disposed between side members 58 and having laterally spaced, upstanding projections 65 secured thereto for engaging the underside of an article. Plates 64 are mounted for reciprocation vertically within members 58, between upstanding side portions 66 of cross members 59 which provide a lower stop and a pair of stop members 67 secured on the upper inside portion of members 58 and providing upper stop shoulders. A bellows or inflatable chamber 68 is secured between each cross member 59 and lifting plate 64. Bellows 68 are expanded to lift plates 64 into engagement with an article and lift the article from rails 54 at that rest position and contracted to lower the articles onto rails 54 in succeeding positions of rest at the end of carriage advance.

This is accomplished by a control circuit as schematically illustrated in FIG. 9 which depicts five exemplary article rest positions although a greater or lesser number can be utilized as desired. Respective, normally open three-way spring return air valves 70A through 70D, such as valves 40A through 40D utilized in the previous embodiment, are secured to carriage 57 adjacent each respective rest position with the exception of input rest position E. A corresponding fixed valve 70S is secured to the base frame adjacent discharge station S. Respective article sensors 71A through 71E and 71S, corresponding to sensors 34 in the embodiment of FIGS. 1 through 5, control actuation of the respective valves. Valves 70A through 70D, bellows 68A through 68E and sensors 71A through 71E are carried by the carriage for reciprocating motion therewith relative to base frame 53.

Air under pressure is supplied to the valves and therethrough to the bellows through a main line 72 flexible at 73 and connected via an electric valve 74 with an air supply, the flexible connection accommodating reciprocating movement of the carriage mounted valves and bellows. Respective subsidiary air lines 75A through 75D and 75S connect the various bellows 68A through 68E with main line 72 via the valves 70A–70D and 70S so that each bellows is controlled by the article sensor and valve associated with the succeeding rest position. Line 75S provides air for valve 70S, the latter controlling bellows 68A; line 75A provides air for valve 70A, the latter controlling bellows 68B, and a similar arrangement is provided for each of the preceding article rest positions.

A limit switch 77 is secured to the base frame adjacent input position E and is actuated by sensor 71E upon receipt of an article at the input. Switch 77 is connected in controlling relation to valve 74, and upon actuation of the former the latter is caused to open, admitting air under pressure into main line 72. Another limit switch 78, connected in series with switch 77, is secured to the base frame and is actuated when piston 63 is fully extended while advancing carriage 57 to close valve 74, thereby interrupting the air supply to main line 72.

Assuming that the conveyor is empty and that an article is placed at position E, the conveyor will advance the article as follows. Sensor 71E detects the article at position E and actuates limit switch 77 causing valve 74 to open and admit the air to main line 72 and to each subsidiary line 75A through 75D and 75S. Since valves 70 are normally open, all bellows 68 will inflate and expand. Particularly, air will pass from main line 72 through subsidiary line 75D, valve 70D and into bellows 68E causing expansion thereof, raising lift plate 64 into abutment with stop members 66. Projections 65 engage the underside of the article at position E, and lift the article from support rails 54. Separate means, not shown, actuate the carriage drive, causing carriage 57 to advance on rollers 56. When the article is fully advanced into position D, piston 63 actuates limit switch 78, closing valve 74 and exhausting air from inflated bellows through valves 70 which have exhaust lines 80. The bellows 68 collapse under the weight of plates 64, even when there is no article on them. This causes the bellows 68E, now at position D, to collapse with its plate 64 engaging lower stops 65. Such lowering of plate 64 leaves the article at rest on rails 54 at position D in vertically spaced relation above projections 65. The drive then retracts carriage 57 to its original position, leaving the article at position D. By repeating the above cycle each article delivered to the conveyor is intermittently advanced therealong from input E to discharge S.

It is a significant feature of this embodiment that the control circuit can disable the individual article advancing means to accumulate the articles on the conveyor. Assuming, for illustrative purposes, that there are articles at discharge station S and positions B, D and E, that positions A and C are empty, and that the article at position S is not removed and is blocking the conveyor. Air is admitted to main line 72 and into each subsidiary line 75 by opening valve 74 as described above. With an article blocking station S, sensor 71S closes the normally open valve 70S causing bellows 68A to remain uninflated. Valve 70A remains open in the absence of an article at position A, causing bellows 68B to expand and lift the article at position B from rails 74. Sensor 71B, while previously holding valve 70B in closed position in response to the presence of an article resting on the rails at position B, now opens valve 70B in response to the raising of the article from the rails at position B causing bellows 68C to inflate. In other words, sensor 71B detects the article at position B only when the article rests on rails 54 and does not detect the same when it is raised from rails 54. Valve 70C remains open in the absence of an article at position C and causes inflation of bellows 68D, lifting the article at that position. Once bellows 68D raise the article at position D from the rails, sensor 71D no longer detects the presence of an article and valve 70D opens, inflating bellows 68E. Thus all bellows 68 are inflated except the bellows at position A.

As in the embodiment of FIGS. 1 through 5, any suitable control valve and timer, not shown, can be used to index the carriage drive to advance carriage 57, thereby advancing the articles at positions B, D and E to positions A, C and D respectively, resulting in articles at positions S, A, C and D with a vacant position at B. The projections 65 on lifting plate 64 at position A is spaced below rails 54 when bellows 68A is deflated and thereby slide under the article at position S during carriage advance. Piston 63, when extended actuates limit switch 78, opening valve 74 and exhausting air from all bellows and main line 72 through the exhaust lines 80 on valves 70A through 70D and 70S, thereby causing the bellows to deflate with the advanced articles coming to rest at positions A, C and D. Then the carriage drive retracts carriage 57 to its initial position. On the next cycle, air is again admitted to line 72, passing through open valve 70B and inflating bellows 68C, thereby lifting the article at position C and from rails 54, causing valve 70C to open and inflate bellows 67D thereby lifting the article at position D from rails 54. This opens valve 70D, inflating bellows 68E to lift an article at position E. Valves 70S and 70A are closed due to the detected presence of an article at those positions. When the carriage drive again advances the carriage, articles are advanced from positions C, D and E to positions B, C and D respectively. Limit switch 78 is actuated as before, causing deflation of the bellows at the advanced position and deposit of the articles on rails 54 at positions B, C and D. The drive then retracts carriage 57, leaving articles accumulated at S, A, B, C and D. Thus, it is apparent that accumulation will take place when any position is empty, and that the conveyor need not be shut down even when all positions are filled.

Thus, in this embodiment the articles are lifted and carried between successive positions, avoiding the sliding friction encountered in the embodiment of FIGS. 1 through 5. This is particularly useful in those situations where such sliding cannot be tolerated or is considered undesirable. Also, this conveyor can handle a wide variety of articles without regard to their bottom surface configuration, including positionally unstable articles.

Accordingly, it is seen that my invention fully accomplishes its intended objects. There is provided an accumulating transfer conveyor maintaining exact index positions throughout the length of the conveyor, permitting intermediate transfer of the articles being conveyed and also permitting further processing on the articles on the conveyor.

Having thus described and illustrated two preferred embodiments of my simplified accumulating transfer conveyor, it will be understood that such description and illustration is by way of example only and that such modifications and changes as may suggest themselves to those skilled in the art are intended to fall within the scope of the appended claims.

I claim:

1. An accumulating transfer conveyor comprising a conveyor frame adapted to support articles at a plurality of positions therealong, transfer means associated with said positions for advancing articles from a first position to successive next adjacent positions, means including article sensing means associated with said positions and operable in response to the presence of an article blocking one of said positions to disable the transfer means associated with the immediately preceding position, the transfer means associated with each of the remaining preceding positions being operable to advance articles to successive next adjacent positions during such disablement so long as there is a vacant position preceding the blocked position.

2. A conveyor according to claim 1, wherein said transfer means includes retractable members associated with said positions adapted to engage articles supported on said frame and move such articles to successive positions therealong, and wherein said disabling means includes means operable to retract said retractable members out of engagement with articles supported on said frame.

3. A conveyor according to claim 1 wherein said transfer means includes a carriage, means for reciprocating said carriage between said positions, retractable article engaging members carried by said carriage and associated with said positions, and wherein said disabling means includes retracting means associated with said positions and carried by said carriage, said retracting means being operable to retract said members from engagement with articles supported on said frame.

4. An accumulating transfer conveyor comprising a conveyor frame adapted to support articles at a plurality of positions therealong, transfer means associated with said positions for advancing articles from a first position to successive position, means including article sensing means associated with said positions and operable in response to the presence of an article blocking one of said positions to disable the transfer means associated with the immediately preceding positions, and means for supporting articles at rest in said positions, said transfer means including means for lifting articles from said article supporting means and carrying the same to successive positions.

5. A conveyor according to claim 4, wherein said transfer means includes a carriage movable relative to said article supporting means between said positions, and wherein said article lifting and carrying means includes expansible fluid chambers carried by said carriage and associated with said positions.

6. A conveyor according to claim 5, wherein said disabling means comprises a fluid control circuit including valves associated with said positions, said valves being connected in parallel and each of said valves being arranged in controlling relation to the expansible chamber associated with the preceding position.

7. A conveyor according to claim 6, together with means to move said carriage between adjacent positions, master valve means in controlling relation to said fluid control circuit, and means responsive to advance of said carriage to close said master valve means.

8. A conveyor according to claim 7, together with means arranged in series with said carriage responsive means for opening said master valve means in response to the presence of an article at the input to said conveyor.

9. An accumulating transfer conveyor comprising a conveyor frame adapted to support articles at a plurality of positions therealong, transfer means associated with said positions for advancing articles from a first position to successive positions, means including article sensing means associated with said positions and operable in response to the presence of an article blocking one of said positions to disable the transfer means associated with the immediately preceding position, said transfer means including retractable members associated with said positions and adapted to engage articles supported on said frame, said disabling means including a fluid control circuit comprising valves associated with said positions, fluid operated means associated with said positions and operable to retract said members from engagement with articles on said frame, each of said valves being arranged in controlling relation to the fluid operated retracting means associated with the preceding positions, and means connecting said valves in series.

10. An accumulating transfer conveyor comprising a conveyor frame adapted to support articles at a plurality of positions therealong, transfer means associated with said positions for advancing articles from a first position to successive positions, means including article sensing means associated with said positions and operable in response to the presence of an article blocking one of said positions to disable the transfer means associated with the immediately preceding position, means for supporting articles at rest in said positions, transfer means including a carriage carried by said frame, means for reciprocating said carriage between said positions, and pusher members associated with said positions pivoted on said carriage and biased into engagement behind articles on said supporting means, and wherein said disabling means includes a fluid control circuit comprising valves carried by said carriage and associated with said positions and a fluid operated means adapted to pivot said pusher members out of engagement with articles on said supporting means, means connecting said valves in series, and means connecting each of said valves in controlling relation to the fluid operated means associated with the preceding position.

References Cited

UNITED STATES PATENTS

| | | | |
|---|---|---|---|
| 1,880,112 | 9/1932 | Shmyroff | 198—218 |
| 2,961,973 | 11/1960 | Bozman | 198—218 X |
| 3,000,489 | 9/1961 | Poel et al. | 198—160 |
| 3,066,788 | 12/1962 | Christiansen | 198—37 X |
| 3,215,260 | 11/1965 | Umbricht et al. | 198—219 |

EVON C. BLUNK, *Primary Examiner.*

M. L. AJEMAN, *Assistant Examiner.*